US006837345B1

(12) United States Patent
Lauble et al.

(10) Patent No.: US 6,837,345 B1
(45) Date of Patent: Jan. 4, 2005

(54) VIBRATION DAMPER FOR A TUBULAR DRIVE SHAFT

(75) Inventors: Christian Lauble, Villingen-Schwenningen (DE); Franz Moser, Hochdorf (DE); Gunther Schlimpert, Murrhardt (DE); Roland Flinspach, Wiernsheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/485,074

(22) PCT Filed: Jul. 24, 1998

(86) PCT No.: PCT/EP98/04659

§ 371 (c)(1),
(2), (4) Date: Sep. 27, 2000

(87) PCT Pub. No.: WO99/06730

PCT Pub. Date: Feb. 11, 1999

(30) Foreign Application Priority Data

Aug. 2, 1997 (DE) .......................... 197 33 478

(51) Int. Cl.[7] .................................................. F16F 7/10
(52) U.S. Cl. ..................... 188/378; 267/141.1; 464/180
(58) Field of Search ............................. 267/293, 281, 267/141.1, 141.2, 141.3, 141.4, 152, 153, 140.3, 140.4, 140.11; 464/82, 83, 89, 90, 180, 179; 88/378–380

(56) References Cited

U.S. PATENT DOCUMENTS

| | | | | | |
|---|---|---|---|---|---|
| 1,850,210 | A | * | 3/1932 | Krotee | |
| 3,403,899 | A | * | 10/1968 | Plume | .......................... 267/35 |
| 4,077,233 | A | * | 3/1978 | Hornig et al. | ................. 464/89 |
| 4,207,957 | A | | 6/1980 | Sivers et al. | |
| 4,471,935 | A | * | 9/1984 | Chiba et al. | ................. 248/638 |
| 4,486,183 | A | * | 12/1984 | Posiviata et al. | ........... 267/148 |
| 4,571,215 | A | * | 2/1986 | Hansen | ........................ 464/180 |
| 4,655,614 | A | * | 4/1987 | Schott | ......................... 384/220 |
| 4,659,069 | A | * | 4/1987 | Odobasic | .................... 267/57.1 |
| 4,826,145 | A | * | 5/1989 | Moore et al. | ................ 267/293 |
| 4,889,328 | A | | 12/1989 | Uno et al. | |
| 4,889,578 | A | * | 12/1989 | Kei et al. | .................... 156/294 |
| 4,935,651 | A | * | 6/1990 | Hong et al. | .................. 310/51 |
| 4,971,456 | A | * | 11/1990 | Hori | ............................. 384/99 |
| 4,988,071 | A | * | 1/1991 | Shimazaki et al. | ......... 248/666 |
| 5,352,157 | A | * | 10/1994 | Ochs et al. | .................... 464/89 |
| 5,374,219 | A | * | 12/1994 | Kohara et al. | ............. 464/111 |
| 5,704,597 | A | * | 1/1998 | Hofmann et al. | ...... 267/140.12 |
| 5,865,429 | A | * | 2/1999 | Gautheron | ............... 267/141.7 |
| 5,918,864 | A | * | 7/1999 | Schafer | ................. 267/140.12 |
| 6,312,340 | B1 | | 11/2001 | Gassen et al. | ............. 464/180 |

FOREIGN PATENT DOCUMENTS

| | | | |
|---|---|---|---|
| DE | 3632418 | A1 * | 3/1988 |
| DE | 9112268 | U1 * | 1/1992 |
| DE | 197 26 293 | | 12/1998 |
| EP | 0009120 | A1 * | 6/1990 |
| EP | 0748949 | A1 * | 12/1996 |
| EP | 0795697 | A2 * | 9/1997 |
| FR | 2 720 132 | | 11/1995 |
| GB | 1341087 | A * | 12/1973 |
| GB | 2 073 363 | | 10/1981 |
| JP | 8312703 | A * | 11/1996 |

* cited by examiner

Primary Examiner—Matthew C. Graham
(74) Attorney, Agent, or Firm—Kenyon & Kenyon

(57) ABSTRACT

A vibration damper for a tubular propeller shaft in the drive train of a motor vehicle having a mass body mounted concentrically, in the propeller shaft or in a sleeve attached in the propeller shaft, by way of at least one rubber spring element. Metal and/or flexible rubber stop elements that limit the vibration travel of the mass body at least in the radial direction are arranged between the mass body and the sleeve. Alternatively, the mass body and/or the sleeve are configured at least locally, in mutually opposite regions, as stop elements that limit the vibration travel of the mass body at least in the radial direction.

20 Claims, 4 Drawing Sheets

VIBRATION DAMPER FOR A TUBULAR DRIVE SHAFT

FIELD OF THE INVENTION

The present invention relates to a vibration damper for a tubular propeller shaft in the drive train of a motor vehicle having a mass body mounted concentrically in a sleeve by way of rubber spring elements, stop elements that limit the vibration travel of the mass body at least in the radial direction being arranged between the mass body and the sleeve.

BACKGROUND OF THE INVENTION

German Patent DE 36 32 418 on the one hand describes a vibration damper whose mass body is attached directly in a hollow drive shaft by way of a rubber spring element which envelops it radially. Also described is a second vibration damper whose mass body is mounted in a sleeve by way of a rubber spring element which also envelops it. The sleeve is embedded in an elastic layer.

The vibration dampers described there, also called cancelers, are installed principally in propeller shafts or propeller shaft tubes. The propeller shaft tubes are loaded on the one hand in torsion by the drive torque, and on the other hand in bending by their own weight and by the mass effect. They must therefore be not only sufficiently stiff in torsion, but also as light as possible. In order for the vibration dampers with their mass bodies to increase the overall weight of the propeller shaft tube as little as possible, the vibration dampers must be capable of being arranged at the optimum point. That point is, for example, the vibration crest of an interfering vibration that is to be canceled.

At the optimum point, the weight of the mass body can have its minimal value.

Since each propeller shaft, as a flexurally elastic rotor, generally exhibits some imbalance as a result, inter alia, of manufacturing tolerances, the centrifugal force also increases with rotation speed. The propeller shaft thus deflects in the direction of the eccentricity of its center of gravity. In the lower range of rotation speeds usual for propeller shafts, the propeller shaft deflection initially rises in proportion to the centrifugal force component, which is related only to the eccentricity in the center of gravity because the centrifugal force component related to the shaft deflection is still small. Above half the deflection-critical rotation speed, the shaft deflection component quickly increases to a multiple of the component of the eccentricity of the center of gravity. In this range, the known rubber-sprung mass bodies can dangerously amplify the imbalance of the entire structure due to an eccentric displacement in the direction of the eccentricity in center of gravity of the propeller shaft.

Also known, from United Kingdom Patent No. GB 2 073 363 A, is a printing roller in which a rubber-sprung mass body is mounted. For this purpose, the mass body is arranged by way of two rubber rings in a sleeve press-fit into the printing roller. The rubber rings sit at the two free ends of the mass body. Arranged next to each rubber ring is a metal ring which limits the radial deflection of the mass body.

SUMMARY OF THE INVENTION

An underlying object of the present invention is therefore that of creating a vibration damper that effectively damps the flexural vibrations of the propeller shaft for specific frequencies without perceptibly increasing the imbalance of the propeller shaft—and thus also the noise emission—in other frequency ranges. As a result of its design, the vibration damper is installable at any desired point with little effort. The installation of multiple vibration dampers can also be possible. In addition, safe vehicle operation is to be guaranteed even in the event of detachment or breakage of the rubber spring elements retaining the mass body.

In an exemplary embodiment of the present invention, the flexible rubber stop elements are arranged—viewed in the circumferential direction—between the rubber spring elements joining the mass body and the sleeve. The stop elements extend over a relatively large circumferential angle as compared with the rubber spring elements, and fill up a large portion of the space located between the mass body, the adjacent rubber spring elements, and the sleeve. Alternatively, the mass body and/or the sleeve are configured locally, in mutually opposite regions—viewed in the circumferential direction—between the rubber spring elements, as stop elements that limit the vibration travel of the mass body at least in the radial direction.

The stop elements limit the mass body excursion to the magnitude necessary in terms of vibration engineering. The vibration dampers damp the vibration excited by the vehicle engine and/or transmission. At the same time, the stop elements prevent any perceptible increase in the total imbalance by mechanically limiting the displacement of the mass body. The noise emission of the drive train is thereby considerably diminished.

The stop elements between the rubber spring elements also prevent any increased imbalance if, for example, the rubber spring elements have broken due to aging and the mass body lies loose in the propeller shaft tube. Without the stop elements, the imbalance additionally generated by the mass body could, in this situation, destroy the propeller shaft.

This also applies to a vibration damper having a mass body arranged in the propeller shaft by way of at least one rubber spring element. In this embodiment of the present invention, the flexible rubber stop elements are arranged directly between the mass body and the propeller shaft. Here again, the mass body and/or the propeller shaft can be configured locally, in mutually opposite regions—viewed in the circumferential direction—between the rubber stop elements, as stop elements that limit the vibration travel of the mass body at least in the radial direction.

With this embodiment, the rubber spring elements are not braced via a sleeve against the propeller shaft tube. They are adhesively bonded, optionally with a profile to compensate for the bore tolerances of the propeller shaft tube, in the propeller shaft tube. For that purpose, the rubber spring elements and/or stop elements are coated with, for example, an adhesive that bonds in the propeller shaft tube when its walls are heated.

Further details of the present invention are evident from the descriptions below of several schematically depicted embodiments.

DETAILED DESCRIPTION OF THE INVENTION

FIGS. 1a to 1d show, in cross section, four different exemplary embodiments of a vibration damper for a propeller shaft tube 1 such as is arranged, for example, in the drive train of a motor vehicle. The four vibration dampers each comprise a mass body 51–53 that is mounted centeredly via rubber spring elements 31, 32 in a sleeve 10, 15. The bonds between rubber spring elements 31, 32 and the respective sleeves 10, 15 as well as the mass bodies 51–53 belonging thereto are preferably created during vulcanization.

Figure 1A:
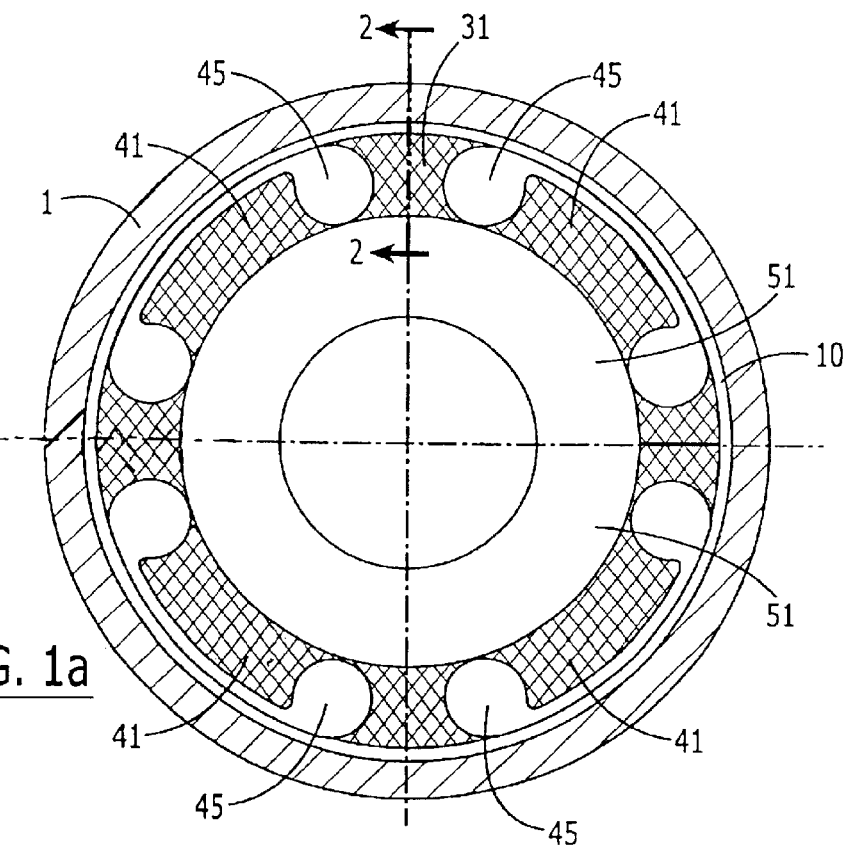
FIG. 1a shows an exemplary embodiment of a vibration damper in cross section.
Figure 1B:
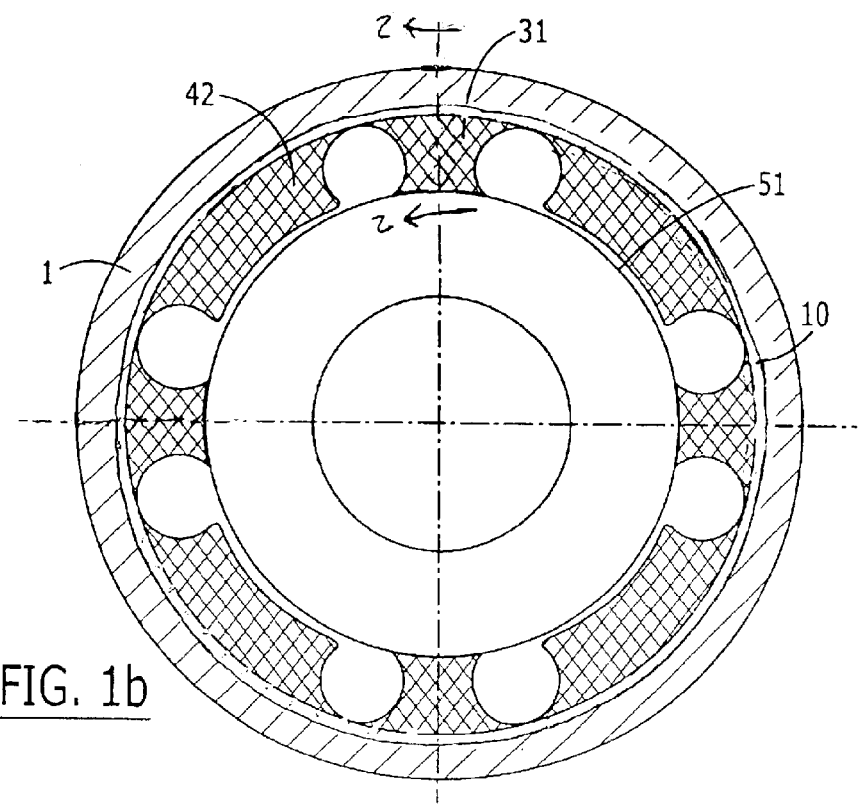
FIG. 1b shows an exemplary embodiment of a vibration damper in cross section.

In the case of the exemplary embodiments shown in FIGS. 1a and 1b, sleeves 10 are of cylindrical configuration. Mass body 51 is a cylindrical tube. It is retained, for example, by four rubber spring elements 31 in each case. Arranged between each two supporting rubber spring elements 31 is a flexible rubber stop element 41. Stop element 41 of the exemplary embodiment shown in FIG. 1a is attached to mass body 51, while stop element 42 of the exemplary embodiment shown in FIG. 1b is retained on sleeve 10. In this case any lateral movement of mass body 51 is prevented, for example, by a crimped-over sleeve edge.

Stop elements 41, 42 extend over a relatively large circumferential angle as compared to rubber spring elements 31, 32, i.e. they fill up a large portion of space 45 located between mass body 51, the adjacent rubber spring elements 41, and sleeve 10. As a result, the vibration travel in the central compression direction of a rubber spring element 31, 32 is only insignificantly greater than in the central compression direction of a stop element 41, 42.

Space 45 between each two adjacent rubber elements 31 has an almost circular cross section. The shape of rubber elements 31 resulting therefrom ensures an optimum bond with respect to metal components 10 and 51.

Figure 1C:
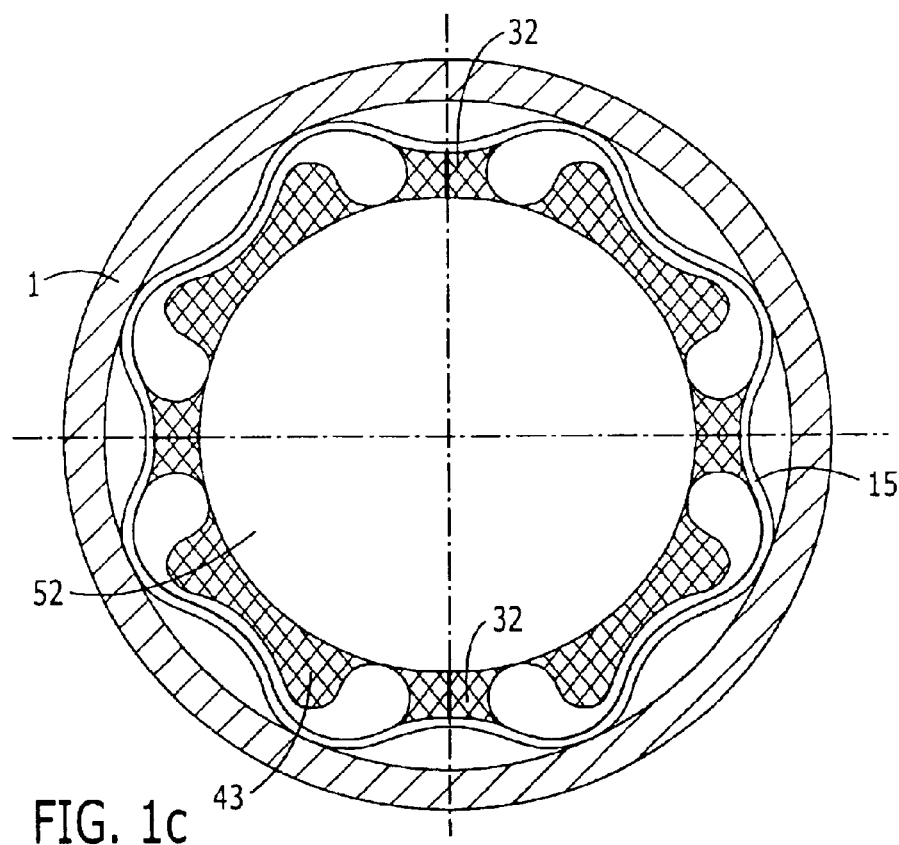
FIG. 1c shows an exemplary embodiment of a vibration damper in cross section.
Figure 1D:
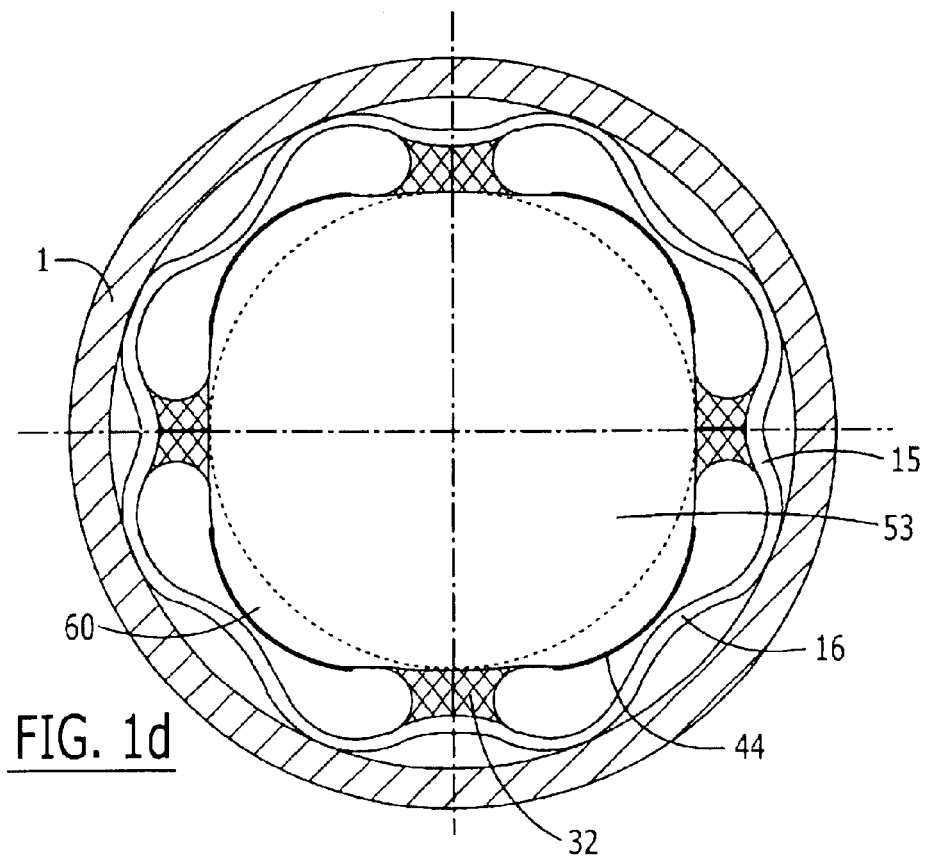
FIG. 1d shows an exemplary embodiment of a vibration damper in cross section.

In FIGS. 1c and 1d, a sleeve 15 having an undulating longitudinal profile is used. The longitudinal sections with respect to the profile shown here in cross section run parallel to the center line of propeller shaft tube 1. Because of the undulating shape of the profile, sleeve 15 is at least sufficiently elastic that it can be pressed without fit problems into propeller shaft tube 1. The residual clamping force of sleeve 15 necessary for a secure fit in propeller shaft tube 1 is ensured over the entire tolerance range for the inside diameter of propeller shaft tube 1. It is consequently possible to dispense with any special reworking of inner wall 2 of propeller shaft tube 1.

In FIG. 1c, there lies between rubber spring elements 32 a stop element 43, attached to mass body 52, that is at least partially adapted to the contour of an undulation trough 16. This adaptation allows damping of the torsional vibration of mass body 52. A rotation of mass body 52 with respect to sleeve 15 causes a reduction in the gap between stop element 43 and undulation trough 16, optionally to zero.

In FIG. 1d, a mass body 53 that has the cross section of a four-sided polygon is used. The exposed polygon regions lie opposite the open undulation troughs 16 of sleeve 15. That is, the mass body 53 includes portions 60 that project toward the troughs 16. To prevent any metal-to-metal contact between sleeve 15 and mass body 53, a thin rubber layer 44 or a layer of a comparable material is applied in each case between rubber spring elements 32. Rubber layer 44 prevents, inter alia, undesirable noise when mass body 53 abruptly deflects, and additionally damps any vibratory excitation resulting from this movement.

Figure 2:
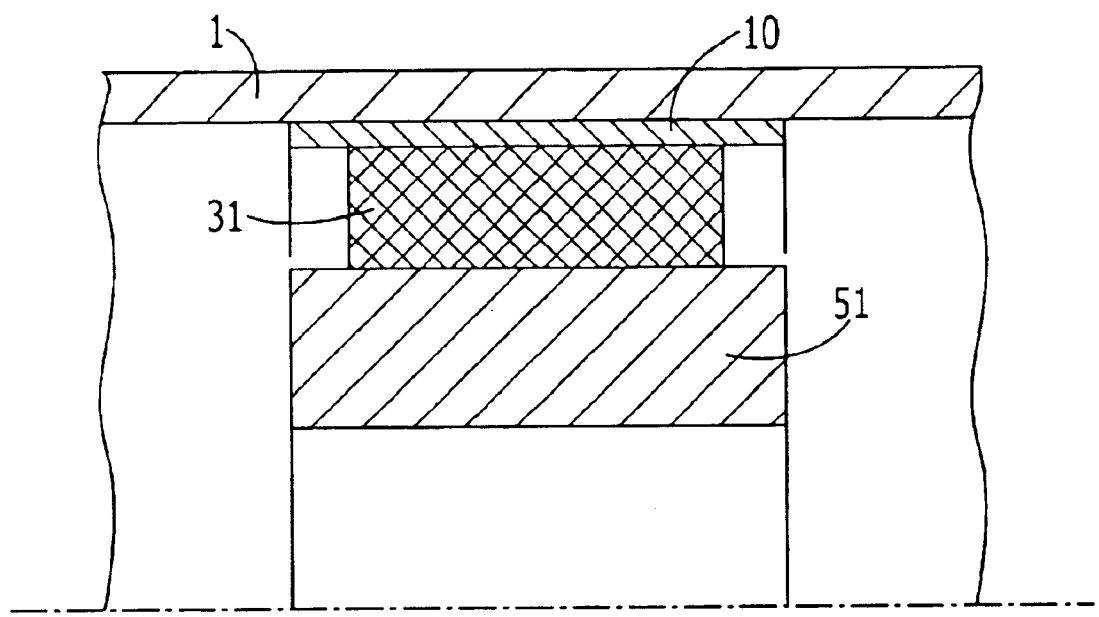
FIG. 2 shows a vibration damper in a halved longitudinal section.

FIG. 2 is a cross-sectional view of an exemplary embodiment of a vibration damper having a cylindrical sleeve 10, a tubular mass body 51, and one of rubber spring elements 31 lying therebetween. The view is equally applicable to both FIGS. 1a and 1b. The latter are narrower in the longitudinal direction than sleeve 10. The projection of sleeve 10 serves, inter alia, to protect the rubber spring and stop elements 31, 41, 42 during installation. Since the vibration dampers are installed by inserting sleeves 10 into propeller shaft tube 1, the insertion tools must be placed against sleeve 10 so as thereby not to load rubber spring elements 31 upon insertion.

For axial retention, the vibration damper can be attached to the laterally projecting segments, for example, by way of spot welds on propeller shaft tube 1. Optionally, attachment to one projecting segment is sufficient. Alternatively, sleeve 10, 15 can be secured by way of center points punched into propeller shaft tube 1 in front, of and behind it. Instead of the center points, circumferential creases can be rolled in. The creases can also be applied only to portions of the sleeve circumference. It is furthermore possible to apply the vibration damper on one side to a shoulder in the interior of the propeller shaft tube, or to jam the sleeve in place on an internal conicity which tapers there. The sleeve can moreover be adhered in the propeller shaft tube by way of an adhesive bond.

In the case of propeller shaft tubes having a tube wall manufactured with high precision, the sleeve can be joined by way of a transverse press fit. In tubes having large bore tolerances, a longitudinally slotted sleeve can be used. In this context, a smooth or profiled rubber coating of the outer contour is also conceivable in order to produce better adhesion.

Figure 3:
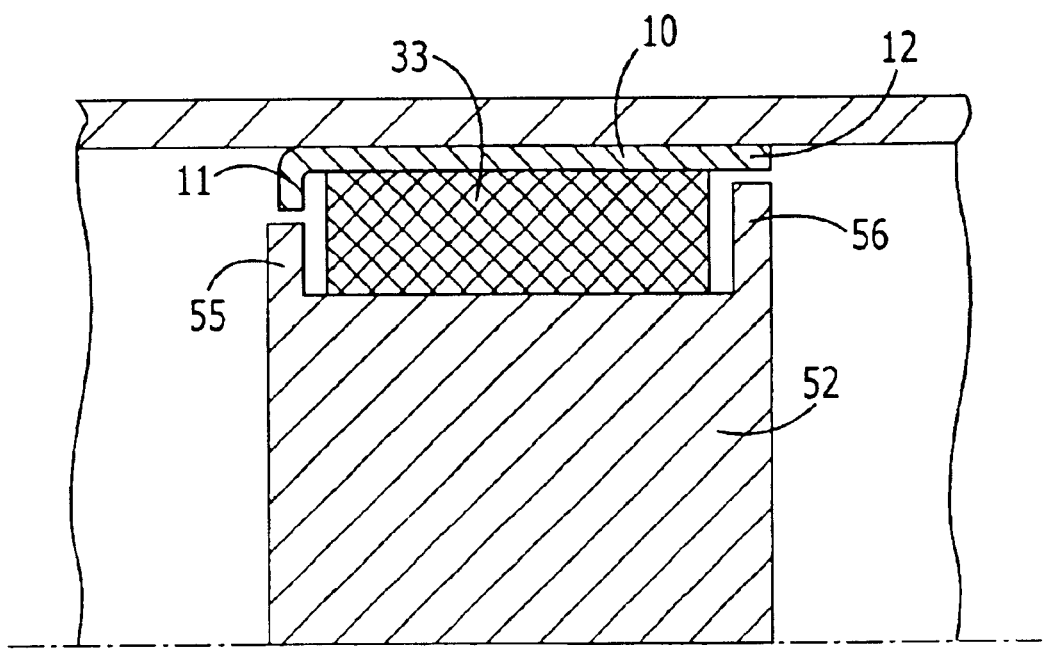
FIG. 3 shows the vibration damper of FIG. 2 including radial stops.

As shown in FIG. 3, which is a cross-sectional view of an exemplary embodiment of a vibration damper, rubber spring element 33 is incorporated between a mass body 52 delimited by rims 55, 56 and a sleeve 10 having a crimped edge 11. Rims 55, 56 and crimped edge 11 serve as radial stops. Upon radial deflection of mass body 52, rim 55 comes into contact with crimped edge 11, and rim 56 with the projecting cylindrical segment 12. The contact zones can be covered with an elastic coating.

Figure 4:
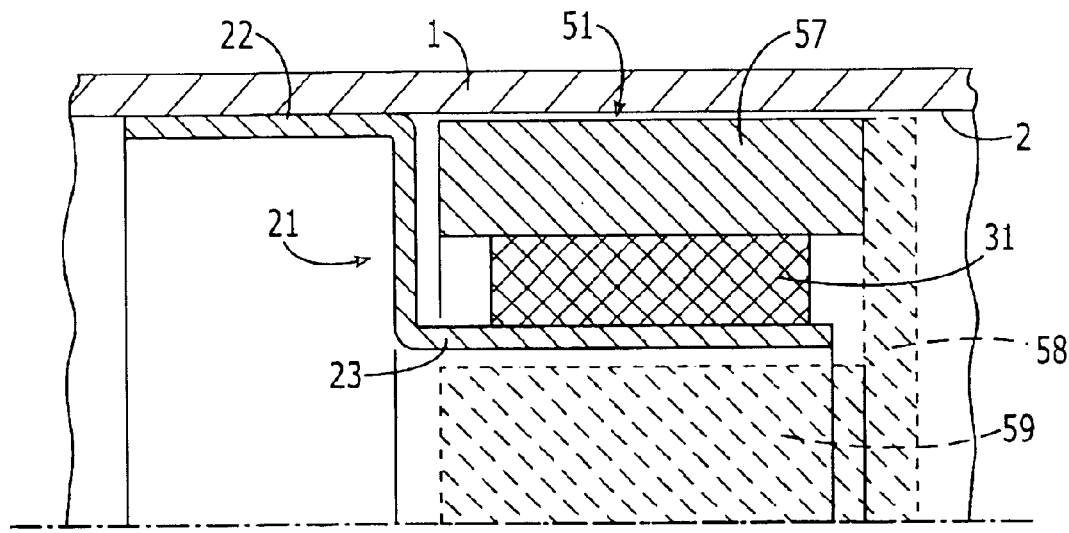
FIG. 4 shows the vibration damper of FIG. 2 including an external mass body.

FIG. 4 shows an exemplary embodiment of a vibration damper having a stepped sleeve 21. The segment with the greater diameter is the installation segment 22. By way of this segment, the vibration damper is retained in propeller shaft tube 1. The segment with the smaller diameter is support segment 23. On the latter, rubber spring elements 31 carrying mass body 51 are arranged. Present between mass body 51 (which in this case is cylindrical) and inner wall 2 of propeller shaft tube 1 is a narrow gap whose width corresponds to half the maximum excursion of mass body 51. In the event of an imbalanced rotation of propeller shaft tube 1, mass body 51 conforms to inner wall 2 over a large contact zone. Mass body 51 is optionally coated on its external periphery with an elastic material. The arrangement shown in FIG. 4 may be provided in conjunction with any of the exemplary embodiments shown FIGS. 1a to 1d.

Mass body 51 can also have the cross-sectional shape of a cup, so that it fits around carrier segment 23 of sleeve 21 (cf. cross-hatched widening of mass body 51). In addition, the mass body can have, for example, a cylindrical extension 59 at base 58 of the cup. The extension 59 would lie concentrically inside the external tubular segment 57 of mass body 51.

A second vibration damper having a configuration described in one of FIGS. 1 through 3 and 5 can furthermore be arranged in support segment 23.

Figure 5:
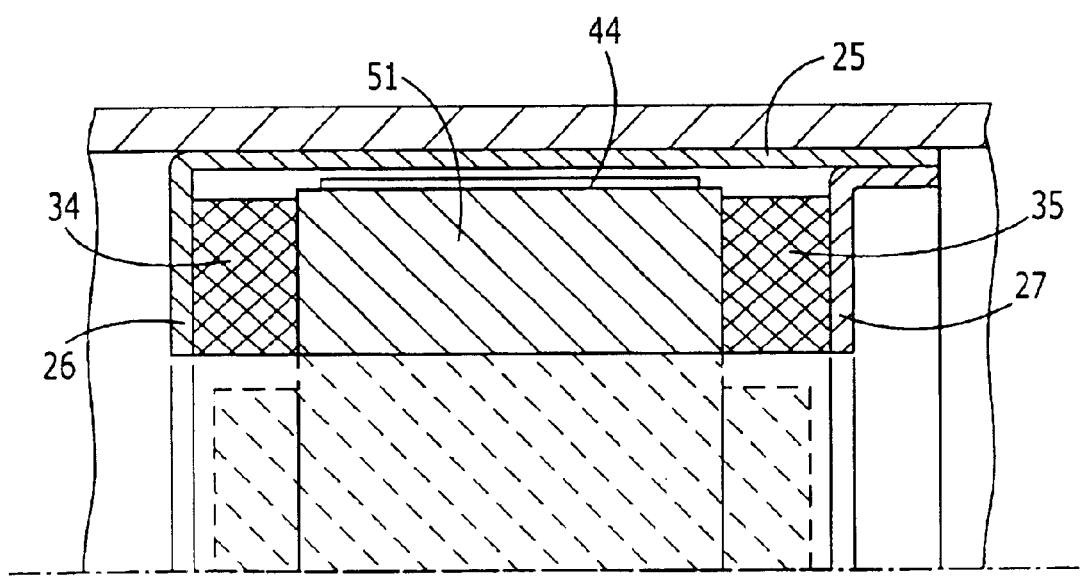
FIG. 5 shows the vibration damper of FIG. 2 including rubber spring elements located on either side of the mass body.

FIG. 5 shows an exemplary embodiment of a vibration damper whose rubber spring elements 34, 35 are loaded primarily in shear in the event of a radial deflection of mass body 51. This stress, which is favorable for the metal/rubber bond, is made possible by a sleeve 25 that is delimited at its end faces by, for example, planar disks 26, 27; a rubber spring element 34, 35 is arranged between each disk 26, 27 and mass body 51. Rubber spring elements 34, 35 are embodied here, for example, as continuous rings. Mass body 51, for example of tubular configuration, can carry a coating 44 on its external contour. In the exemplary embodiment, sleeve 25 is embodied as a bushing that is closed off by a spot-welded cover 27.

The central bore of the vibration damper facilitates manufacture, but is not absolutely necessary. Mass body 51 can optionally be widened, as illustrated in FIG. 5 with cross-hatching.

Such widenings (cf. also FIG. 4) have the advantage that the mass of the respective mass body 51–53 can be modified, with no change in the design of sleeves 21–25, in order to adapt the vibration behavior of the vibration damper to specific interference frequencies of different propeller shaft tubes 1 having the same inside diameter.

Regardless of the location at which stop elements 41–43 are attached, the radial clearance of the individual mass bodies 51–53 in the corresponding sleeves or with respect to inner wall 2 of propeller shaft tube 1 is, for example, approximately 0.5 to 1 mm in terms of the inner radius of the sleeve or propeller shaft tube. Depending on the vibration behavior of propeller shaft tube 1, the gap can have a defined dimension. As a rule, higher interference frequencies will require smaller gaps to prevent the imbalance of the combination of propeller shaft tube 1 and mass body 51–53 from becoming too great.

What is claimed is:

1. A vibration damper for a rotatable tubular propeller shaft in the drive train of a motor vehicle, the vibration damper comprising:

a sleeve arranged in the shaft and rotatable with the shaft, the sleeve defining a radial and circumferential direction;

a mass body mounted concentrically in the sleeve;

a plurality of rubber spring elements for mounting the mass body to the sleeve; and a plurality of flexible stop elements, each flexible stop element disposed circumferentially between adjacent spring elements and disposed between the mass body and the sleeve to define a discrete space to limit a vibration travel of the mass body at least in the radial direction, wherein a contact surface of each stop element extends over a larger circumferential angle than the spring elements and than between an area between each stop element and each adjacent rubber spring element, such that each stop element occupies a large portion of a space between the mass body, the spring elements and the sleeve.

2. The vibration damper as recited in claim 1 wherein the flexible stop elements include rubber.

3. The vibration damper as recited in claim 1 further comprising a propeller shaft mounted concentrically with the sleeve and wherein the sleeve includes a first and a second tube segment joined together, the first tube segment having a greater outside diameter than an outside diameter of the second tube segment and corresponding approximately to an inside diameter of the propeller shaft, the second tube segment carrying the mass body on an outer contour, at least one of the plurality of spring elements connecting the second tube segment to the mass body, the mass body being annular at least in an area of connection with the second tube segment.

4. The vibration damper as defined in claim 1 wherein the sleeve further defines an axial direction and wherein the mass body is mounted axially between at least two of the plurality of spring elements and the sleeve fits axially around the mass body.

5. The vibration damper as defined in claim 15, wherein the sleeve includes a tubular segment having two sides and two end faces, planar, disk-shaped regions being included at both end faces, the plurality of spring elements being attached to the disk-shaped regions.

6. The vibration damper as recited in claim 1, further comprising a gap between one of (i) the mass body and the flexible stop elements and (ii) the flexible stop elements and the sleeve, said gap configured such that one of (a) the mass body and the flexible stop elements and (b) the flexible stop elements and the sleeve do not contact in a non-rotating state of the shaft.

7. A vibration damper for a rotatable tubular propeller shaft in the drive train of a motor vehicle, the vibration damper comprising:

a rotatable propeller shaft, the propeller shaft defining a radial and a circumferential direction;

a mass body arranged concentrically in the propeller shaft;

a plurality of rubber spring elements for mounting the mass body to the propeller shaft; and a plurality of stop elements configured to limit a vibration travel of the mass body at least in the radial direction, the stop elements being disposed between the mass body and the propeller shaft and circumferentially between adjacent rubber spring elements so as to define a discrete space, the stop elements including at least one of metal or rubber; and wherein a contact surface of each stop element extends over a larger circumferential angle than the spring elements and than between an area between each stop element and each adjacent rubber spring element, such that each stop element occupies a large portion of a space between the mass body, the spring elements and the shaft.

8. A vibration damper for a rotatable tubular propeller shaft in the drive train of a motor vehicle, the vibration damper comprising:

a sleeve arranged in the shaft and rotatable with the shaft, the sleeve defining a radial and circumferential direction;

a mass body mounted concentrically in the sleeve;

a plurality of rubber spring elements for mounting the mass body to the sleeve; and wherein at least one the mass body and the sleeve at least partially form, in circumferentially opposite regions between the rubber spring elements, a plurality of stop elements configured to limit a vibration travel of the mass body in at least the radial direction, wherein the stop elements define discrete spaces and wherein a contact surface of each stop element extends over a larger circumferential angle than the spring elements and than between each stop element and each adjacent rubber spring element.

9. The vibration damper as recited in claim 8 wherein the flexible stop elements include rubber.

10. The vibration damper as recited in claim 8 wherein the sleeve includes an undulating longitudinal profile having troughs, the spring elements being arranged at the troughs, and at least a portion of the troughs serving as at least a portion of the stop elements.

11. A vibration damper for a rotatable tubular propeller shaft in the drive train of a motor vehicle, the vibration damper comprising:
   a rotatable propeller shaft defining a radial and a circumferential direction;
   a mass body arranged concentrically in the propeller shaft; and
   a plurality of rubber spring elements for mounting the mass body to the propeller shaft;
   wherein at least one of the mass body and the propeller shaft at least partially form, in circumferentially opposite regions between the rubber spring elements, a plurality of stop elements configured to limit a vibration travel of the mass body in at least the radial direction, such that a vibration travel in a central compression direction of the plurality of rubber spring elements is insignificantly greater than in the central compression direction of the plurality of stop elements; and
   wherein a gap, between one of (i) the mass body and the flexible stop elements and (ii) the flexible stop elements and the shaft, is configured such that one of (a) the mass body and the flexible stop elements and (b) the flexible stop elements and the shaft do not contact in a non-rotating state of the shaft.

12. A vibration damper for a rotatable tubular propeller shaft in the drive train of a motor vehicle, the vibration damper comprising:
   a rotatable propeller shaft defining a radial and a circumferential direction;
   a mass body arranged concentrically in the propeller shaft; and
   a plurality of rubber spring elements for mounting the mass body to the propeller shaft;
   wherein the propeller shaft at least partially forms, in circumferentially opposite regions between the rubber spring elements, a plurality of stop elements configured to limit a vibration travel of the mass body in at least the radial direction, such that a vibration travel in a central compression direction of the plurality of rubber spring elements is insignificantly greater than in the central compressions direction of the plurality of stop elements; and
   wherein a gap between the stop elements and the mass body is configured such that the mass body and the stop elements do not contact in a non-rotating state of the shaft.

13. A vibration damper for a rotatable tubular propeller shaft in the drive train of a motor vehicle, the vibration damper comprising:
   a rotatable propeller shaft defining a radial and a circumferential direction;
   a mass body arranged concentrically in the propeller shaft; and
   a plurality of rubber spring elements for mounting the mass body to the propeller shaft;
   wherein the mass body at least partially forms, in circumferentially opposite regions between the rubber spring elements, a plurality of stop elements configured to limit a vibration travel of the mass body in at least the radial direction, such that a vibration travel in a central compression direction of the plurality of rubber spring elements is insignificantly greater than in the central compression direction of the plurality of stop elements; and
   wherein a gap between the stop elements and the shaft is configured such that the stop elements do not contact the shaft in a non-rotating state of the shaft.

14. A motor vehicle drive train, comprising:
   a rotatable tubular propeller shaft;
   a sleeve arranged concentrically in the propeller shaft;
   a mass body arranged concentrically in the propeller shaft and rotatable with the propeller shaft;
   a plurality of rubber spring elements arranged to mount the mass body to the propeller shaft;
   a plurality of stop elements, each stop element arranged circumferentially between adjacent spring elements and arranged between the mass body and the propeller shaft, the stop elements configured to limit a vibration travel of the mass body at least in a radial direction, the stop elements including at least one of:
      flexible stop elements extending from the sleeve, the stop elements extending from the sleeve over a circumferential angle larger than a circumferential angle of the spring elements, the stop elements filling substantially an entire portion of a space located between the mass body, the rubber spring elements and the sleeve with a radial gap between the stop elements and the mass body;
      flexible stop elements extending from the mass body, the stop elements extending from the mass body over a circumferential angle larger than the circumferential angle of the spring elements, the stop elements filling substantially the entire portion of the space located between the mass body, the rubber spring elements and the sleeve with a radial gap between the stop elements and the sleeve; and
      portions of at least one of the mass body and the sleeve projecting toward each other in opposite areas to limit a vibration path of the mass body at least in a radial direction at least in sections around the mass body.

15. The motor vehicle drive train as recited in claim 14 wherein the stop elements include rubber.

16. The motor vehicle drive train as recited in claim 14 wherein the sleeve includes an undulating longitudinal profile having troughs, the spring elements arranged at the troughs, and at least a portion of the troughs serving as at least a portion of the stop elements.

17. The motor vehicle drive train as recited in claim 14 wherein the sleeve includes a first and a second tube segment joined together, the first tube segment having a greater outside diameter than an outside diameter of the second tube segment and corresponding approximately to an inside diameter of the propeller shaft, the second tube segment carrying the mass body on an outer contour, at least one of the plurality of spring elements connecting the second tube segment to the mass body, the mass body being annular at least in an area of connection with the second tube segment.

18. The motor vehicle drive train as recited in claim 14 wherein the sleeve further defines an axial direction and wherein the mass body is mounted axially between at least two of the plurality of spring elements and the sleeve fits axially around the mass body.

19. The motor vehicle drive train as recited in claim 18 wherein the sleeve includes a tubular segment having two sides and two end faces, planar, disk-shaped regions included at both end faces, the plurality of spring elements attached to the disk-shaped regions.

20. The vibration damper as recited in claim 14, further comprising a gap between one of (i) the mass body and the flexible stop elements and (ii) the flexible stop elements and the sleeve, said gap configured such that one of (a) the mass body and the flexible stop elements and (b) the flexible stop elements and the sleeve do not contact in a non-rotating state of the shaft.

* * * * *